H. HAEFLIGER.
COMBINED MICROSCOPE AND OBJECT HOLDER.
APPLICATION FILED FEB. 24, 1917.
1,267,862.
Patented May 28, 1918.
2 SHEETS—SHEET 1.
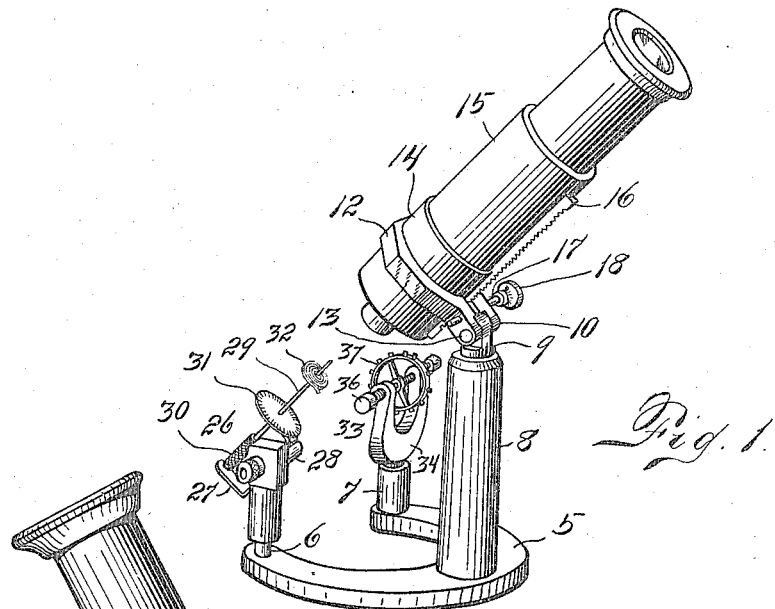
Fig. 1.
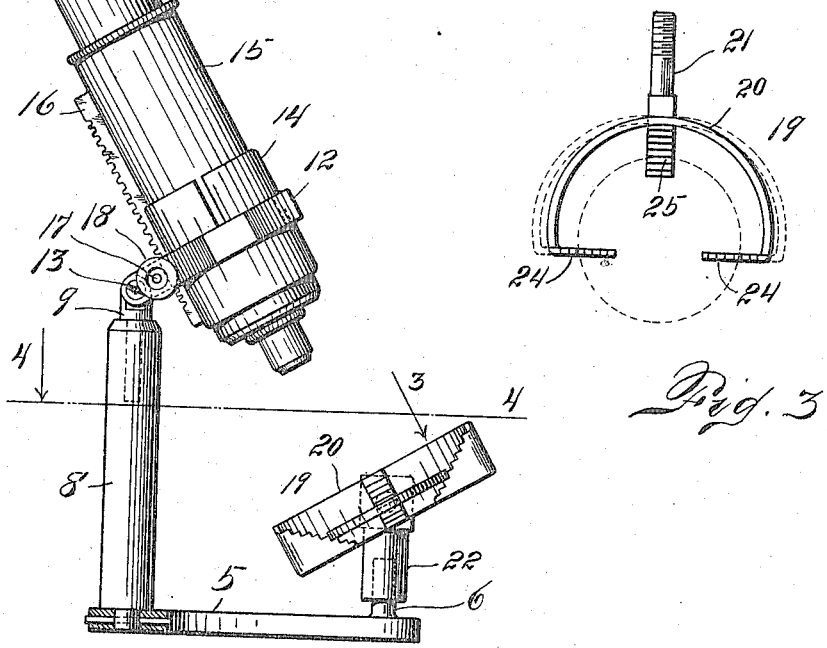
Fig. 2.
Fig. 3.
Inventor
H. Haefliger
Attorney

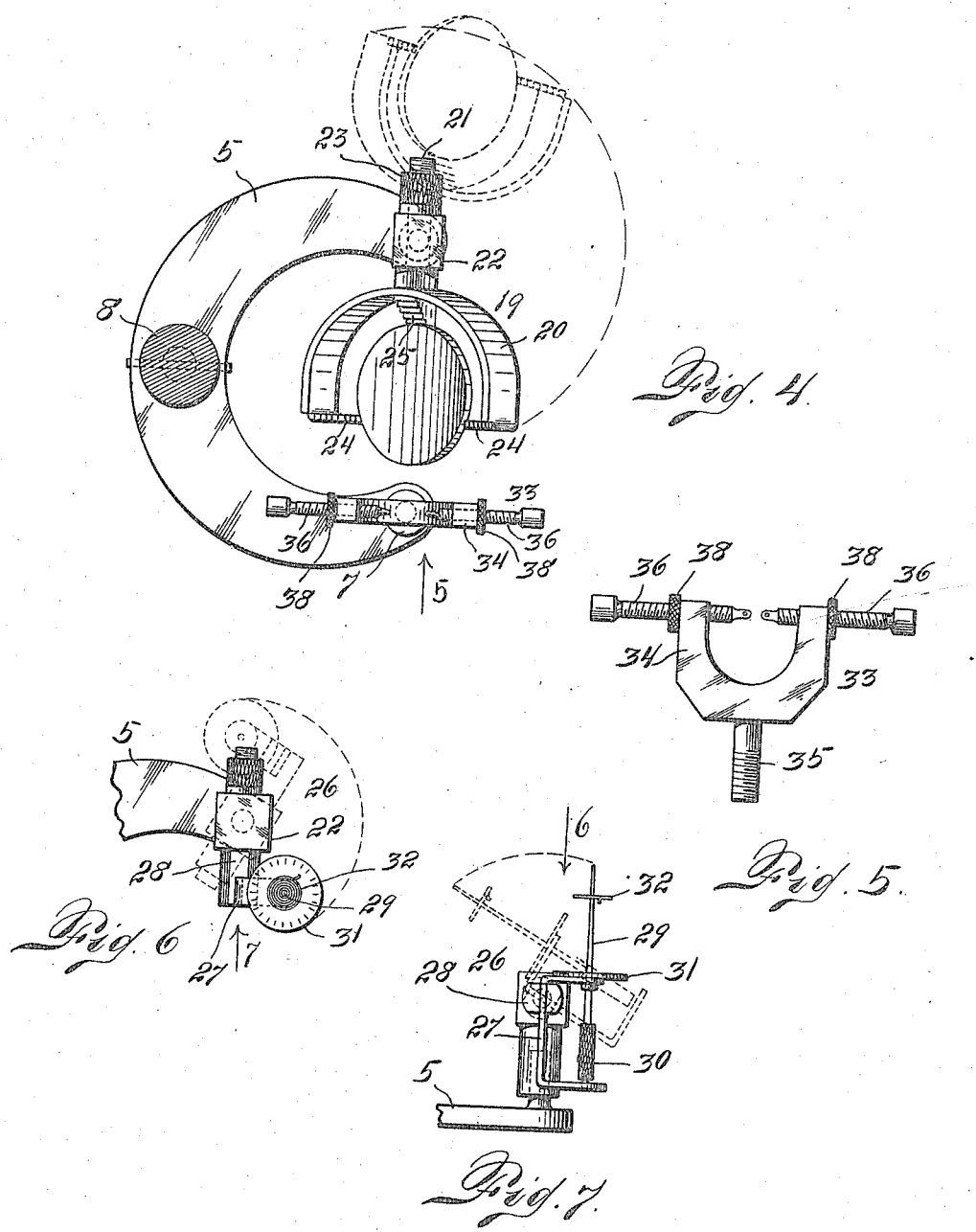

UNITED STATES PATENT OFFICE.

HERMAN HAEFLIGER, OF DENVER, COLORADO.

COMBINED MICROSCOPE AND OBJECT-HOLDER.

1,267,862.　　　　　Specification of Letters Patent.　　Patented May 28, 1918.

Application filed February 24, 1917.　Serial No. 150,857.

*To all whom it may concern:*

Be it known that I, HERMAN HAEFLIGER, a citizen of Switzerland, residing at the city and county of Denver and State of Colorado, have invented certain new and useful Improvements in Combined Microscopes and Object-Holders; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a device comprising a combination of elements so arranged that an article requiring the minutest, the most thorough inspection, can be secured in various positions of adjustment to be observed through a microscope which is also adjustably mounted, and my device is especially valuable to jewelers and watch makers since it is more particularly adaptable for use in the examination of the various parts of watches, jewels, precious stones and the like, as microscopic inspection of such articles is absolutely necessary in order that they may be properly examined and repaired.

My construction briefly stated comprises a curved base plate upon the extremities of which holders of various types are adapted to be adjustably mounted and these holders are so constructed that the articles which they are adapted to support can be adjusted to various positions upon the same. Also mounted upon the base plate intermediate the extremities of the latter is a post upon which is adjustably supported a microscope and the arrangement of the said microscope with relation to the holders is such that the said elements coöperate to allow a most thorough and efficient examination of the article and at the same time render the latter most accessible for repairing purposes.

An important feature of my invention is that after the microscope has been properly adjusted and focused with relation to the article supported by the holder, its relative position will remain fixed and the operator is free to employ both hands for manipulating and repairing purposes.

Heretofore, so far as I am aware, it has been customary for jewelers to hold a magnifying glass in front of one eye and the article to be examined or repaired with one hand, whereby the operator never has more than one hand free while inspecting an article, and also every time he moves his head the range of vision is changed.

Furthermore, by employing an adjustable microscope in combination with adjustable holders, the article under inspection is not only magnified to a greater degree than has been possible heretofore, but it is possible for a customer to detect a flaw or imperfection in a jewel or similar article as readily as one skilled in the art.

Having briefly outlined my improved construction, I will proceed to describe the same in detail, reference being made to the accompanying drawing, in which is illustrated an embodiment thereof. In this drawing—

Figure 1 is a perspective view of my improved construction showing two holders in place and suitable articles supported thereby.

Fig. 2 is a side view in elevation of my improved construction showing a different form of holder from those disclosed in Fig. 1.

Fig. 3 is a detail view of one of my holders looking in the direction of the arrow 3 Fig. 2.

Fig. 4 is a view taken on the line 4—4 Fig. 2 looking in the direction of the arrow.

Fig. 5 is a detail view of another form of holder looking in the direction of arrow 5 Fig. 4.

Fig. 6 is a view of still another form of holder looking in the direction of the arrow 6 Fig. 7.

Fig. 7 is a view of the same type of holder as disclosed in Fig. 6, but looking in the direction of the arrow 7 Fig. 6.

The same reference characters indicate the same parts in all the views.

Let the numeral 5 designate a curved base plate upon one extremity of which is secured an upwardly projecting pin 6, while upon the other extremity of said base is mounted a sleeve 7. A post 8 is also secured to this base plate midway of the extremities of the latter, its upper surface being recessed to receive the lower inwardly offset portion of a pin 9. The upper extremity of said pin 9 is flattened and perforated and adapted to be inserted between the rearwardly extending extremities 10 of a collar 12, these extremities having alined perforations therein whereby the collar 12 can be pivotally connected with the pin 9 by means of a pin 13 passed through the aforesaid perforations in the said pin 9 and collar extremities.

Within the collar 12 is secured a split sleeve 14 and in which sleeve is slidably mounted a microscope 15 of the usual construction.

To the under side of this microscope is attached a tooth bar 16 adapted to coöperate with a small cogged wheel, the said bar 16 extending between the split extremities of the sleeve 14 and the extremities 10 of the collar 12, sufficient space being also left between these collar extremities to receive the cogged wheel which is mounted upon a pin 17 passed through the perforations formed in the said extremities. One end of this pin is provided with a knob 18 for manipulating purposes.

In view of the above description, it will be readily observed that three distinct movements can be imparted to the microscope, viz., it can be rotated upon the post 18 by virtue of the connection between the latter and the pin 9, it can be oscillated in a vertical plane upon its fulcrum 13 and can be extended upwardly and downwardly by turning the knob 18 on the pin 17 which will rotate the cogged wheel and impart movement to the toothed bar 16.

Referring to Figs. 2, 3 and 4, the numeral 19 designates a holder comprising an approximately semi-circular shaped band 20 composed of material having a limited degree of resiliency. Attached to the outer surface of this band and midway between its extremities is a post 21 which is adapted to be loosely inserted through a perforation in the upper extremity of a fitting 22 which is rotatably mounted upon the upwardly projecting pin 6 secured to one extremity of the base plate 5. The outer extremity of the post 21 is threaded to receive nut 23 having a milled surface, the said nut adapted to abut against the fitting 22 whereby the said holder can be secured in the desired position of adjustment.

Attention is called to the fact, that while the fitting 22 is rotatably mounted upon the pin 6, nevertheless the engagement between the said elements is sufficiently close to prevent free movement of the said fitting. The extremities of the band 20 are provided with inwardly extending and oppositely disposed triangular shaped portions 24, the hypotenuse of said portions being notched, as is also the hypotenuse of a similarly shaped portion 25 attached to the inner surface of the said band midway between the extremities of the latter and directly opposite the post 21.

The respective notches of the above referred to triangular portions 24 and 25 are in circumferential alinement and are adapted to engage the periphery of the works of a watch or similarly shaped article and the same will be tightly clamped between the triangular portions since the band 20 has a certain degree of resiliency (see Fig. 3), and in view of this fact, the holder 19 can be swung on the pivot 6 (as indicated in dotted lines Fig. 4) and moved on its pivot 21 without dislodging or changing the relative position of the article clamped therein.

Referring to Figs. 1, 6 and 7 a holder 26 can also be pivotally mounted upon the fitting 22, the said holder comprising a U-shaped bracket 27 and a post 28 secured thereto and extending at right angles therefrom, the said post adapted to be loosely inserted in the perforation in the upper extremity of the fitting 22. The outer extremity of this post is threaded to receive a nut for the same purpose as before indicated.

The legs of the bracket loosely support a tapering pin 29 which extends between and above the said legs, the portion between the latter having a part of its surface milled as disclosed at 30 to facilitate the turning of the same. Mounted upon said pin above the bracket 27 and in close proximity thereto is a white dial 31 having suitable indicia thereon so that when the hair spring of a watch 32 or other similar article is mounted upon the upper extremity of the pin 29 and examined under the microscope 15, the portion of the said article that needs altering not only can be readily ascertained, but the position of such imperfection can be so determined with relation to the indicia upon the dial that the exact point at which it occurs can be easily located after the article is removed from under the microscope. Also, if it should be necessary to adjust the tension of the hair spring 32, the degree of change in the tension can be determined by referring to the indicia upon the dial 31.

Again referring to Figs. 1, 4 and 5, the numeral 33 designates still another form of holder which comprises the U-shaped portion 34 having a post 35 attached centrally to the portion connecting the two legs thereof, this post 35 adapted to be adjustably inserted in the upper extremity of the sleeve 7 secured to one extremity of the base plate 5. The outer extremities of the legs of the U-shaped holder 33 are provided with threaded perforations adapted to receive screws 36, the heads of which are milled to facilitate adjustment of the same. The inner extremities of these screws are fashioned to engage from opposite sides the hub portion of a balance wheel 37, the engagement being such that the said wheel can be freely revolved. Lock nuts or washers 38 are mounted upon the screws 36 between the holder and the respective heads of said screws to secure the latter in the desired position of adjustment.

Several forms of holders are shown and have been described, but I do not wish to limit myself to any particular holder since I am aware that various types of holders may be employed, the type depending upon the character of the article to be examined.

In view of the foregoing description, it is believed that it will be readily understood that articles of the nature above referred to and which require microscopic inspection, in order that they may be properly examined and repaired, can be adjustably mounted in suitable holders and these holders also adjustably mounted upon the base of the structure so that the said articles may be viewed through the microscope which has also several adjustments and by virtue of these many adjustments of the various elements, the articles can be inspected from all necessary angles which results in a thorough and complete examination.

Furthermore, after the article has been examined under the microscope, the holder if desired can be swung to one side of the device (as disclosed by dotted lines in Figs. 5 and 6) in order that another article may be examined or for the purpose of rendering the first named article more accessible to work on.

Having thus described my invention, what I claim is:—

1. The combination of a curved base plate, holders adjustably mounted upon the extremities of said plate, a post also mounted upon the plate intermediate the extremities of the latter, and a microscope adjustably supported upon said post and adapted to coöperate with the holders for the purpose set forth.

2. The combination of a curved base plate, a pin secured upon one extremity of said plate, and a sleeve secured upon the other extremity of the latter, holders adapted to be adjustably mounted upon the said pin and sleeve respectively, a post also mounted upon the base plate intermediate the extremities of the latter, and a microscope adjustably supported upon said post and adapted to coöperate with the holders for the purpose set forth.

3. The combination of a base plate, a pin secured upon the latter, a fitting rotatably mounted upon said pin, a holder pivotally attached to the fitting, a post mounted upon the base plate, and a microscope adjustably supported upon said post and adapted to coöperate with the holder for the purpose set forth.

4. The combination of a curved base plate, a pin secured upon one extremity of the latter, and a sleeve secured upon the other extremity of said plate, a fitting rotatably mounted upon the pin, a holder adapted to be pivotally attached to said fitting, and another holder adapted to be adjustably mounted in the said sleeve, a post also secured to the base plate, and a microscope adjustably supported upon the post and adapted to coöperate with the said holders for the purpose set forth.

5. The combination of a base plate, a pin secured upon the latter, a fitting rotatably mounted upon said pin, a holder pivotally attached to the fitting, said holder comprising an approximately semi-circular band, the extremities of said band being provided with inwardly disposed triangular shaped notched portions, a similar shape notched portion being also secured to the inner surface of the band intermediate the extremities of the latter, and the said notched portions adapted to receive and retain in position a suitable object, a post mounted upon the base plate, and a microscope adjustably supported upon said post whereby the object retained within the said holder can be inspected.

6. The combination of a base plate, a holder adjustably mounted upon the latter, said holder comprising an approximately semi-circular band, notched portions secured to the interior surface of said band and adapted to receive and retain in position a suitable object, a post also mounted upon the base plate, and a microscope adjustably supported upon said post whereby the object retained within the holder can be inspected.

In testimony whereof I affix my signature, in presence of two witnesses.

HERMAN HAEFLIGER.

Witnesses:
 MARY HIGGINS,
 A. EBERT O'BRIEN.